(12) United States Patent
Weres et al.

(10) Patent No.: US 7,077,937 B2
(45) Date of Patent: Jul. 18, 2006

(54) LARGE SURFACE AREA ELECTRODE AND METHOD TO PRODUCE SAME

(76) Inventors: Oleh Weres, 19 Ravenwood La., Napa, CA (US) 94558; Henry Edward O'Donnell, 280 Underhill Dr., Napa, CA (US) 94558

( * ) Notice: Subject to any disclaimer, the term of this patent is extended or adjusted under 35 U.S.C. 154(b) by 377 days.

(21) Appl. No.: 10/613,832

(22) Filed: Jul. 3, 2003

(65) Prior Publication Data

US 2004/0003993 A1    Jan. 8, 2004

Related U.S. Application Data

(63) Continuation-in-part of application No. 09/855,293, filed on May 14, 2001, now Pat. No. 6,589,405.

(60) Provisional application No. 60/412,484, filed on Sep. 20, 2002.

(51) Int. Cl.
*C25B 11/03* (2006.01)
*C25B 11/04* (2006.01)
*C25B 11/08* (2006.01)

(52) U.S. Cl. ............ 204/284; 204/290.01; 204/290.14; 204/292; 204/293; 204/280; 428/605; 428/606; 148/670; 29/419.1; 29/424

(58) Field of Classification Search ................ 204/292, 204/293, 280, 284, 290.01, 290.14; 428/605, 428/606; 148/670; 29/419.1, 424
See application file for complete search history.

(56) References Cited

U.S. PATENT DOCUMENTS

| | | | |
|---|---|---|---|
| 3,835,514 A | 9/1974 | Pollock | |
| 3,895,960 A | 7/1975 | Brown | |
| 4,331,523 A | 5/1982 | Kawasaki | |
| 4,447,509 A | 5/1984 | Maskalick | |
| 4,680,100 A | 7/1987 | Morin | |
| 4,708,888 A | 11/1987 | Mitchell | |
| 5,041,196 A | 8/1991 | Cawlfield | |
| 5,064,514 A | 11/1991 | Cawlfield | |
| 5,084,149 A | 1/1992 | Kaczur | |
| 5,108,560 A | 4/1992 | Cawlfield | |
| 5,158,658 A | 10/1992 | Cawlfield | |
| 5,294,319 A | 3/1994 | Kaczur | |
| 5,298,280 A | 3/1994 | Kaczur | |
| 5,439,577 A | 8/1995 | Weres | |
| 5,783,050 A * | 7/1998 | Coin et al. .................. 204/284 |
| 6,325,875 B1 * | 12/2001 | Amamoto .................. 148/670 |

* cited by examiner

*Primary Examiner*—Bruce F. Bell
(74) *Attorney, Agent, or Firm*—Oleh Weres

(57) ABSTRACT

A large surface area electrode well-suited to electrochemical applications is produced by winding many turns of a metallic fiber tow on to a sheet metal rectangle. In the preferred embodiment, an anode that can be used to purify water by electrochemical production of hydroxyl free radical is made by winding titanium fiber tow on to a rectangular substrate made of titanium sheet, and applying a suitable multilayered electrocatalytic coating. Made of other metals, an electrode of this description can also serve as the cathode of an electrochemical cell, or as a battery plaque.

18 Claims, 3 Drawing Sheets

LARGE SURFACE AREA ELECTRODE AND METHOD TO PRODUCE SAME

RELATED PATENT APPLICATIONS

This application is a Continuation-in-Part of U.S. Regular patent application Ser. No. 09/855,293 which was filed 14 May 2001, now U.S. Pat. No. 6,589,405. It also claims benefit of PCT/US01/15531, filed 15 May 2000, from which the aforesaid application was derived. This application also claims benefit of U.S. Provisional Patent Application 60/412,484 which was filed 20 Sep. 2002.

U.S. Pat. No. 6,589,405, which is hereby incorporated by reference, describes a multilayered metal oxide coating which may beneficially be applied to an electrode of the kind provided herein and made of titanium to produce an anode that can used to electrolytically purity water by oxidizing pollutants dissolved in the water. U.S. Patent 6,589,405 also describes a an electrochemical cell which is well suited for water purification applications and incorporates the electrodes provided herein.

BACKGROUND OF THE INVENTION

1. Field of Invention

Winding many turns of a fine metallic fiber tow wound about a rectangle of sheet metal produces an electrode of large surface area which is well suited for electrolytic water purification and other electrolytic processes. An electrode of this description can also serve as a battery plaque.

2. Description of Prior Art

In process electrochemistry, increasing electrode surface area improves the kinetics of the electrochemical process at low reactant concentration. Increased surface area also decreases the true current density at the surface in proportion, allowing the cell to operate at lower voltage and increasing the service life of the electrode. In batteries, increased surface area of the electrode plaques provides improved contact with the active material, decreasing overvoltage and improving energy conversion efficiency. In practice, large surface area process electrodes and battery plaques are very similar and their design is governed by much the same criteria, allowing technology to be usefully transferred between the two fields.

In U.S. Pat. No. 3,895,960 Brown et al. provided an electrode plaque made by compressing and diffusion bonding iron fibers, attaching a current collector by mechanical means or by welding, and plating the entire assembly with nickel to provide the needed electrocatalytic surface properties. In Brown's Example 1, iron fibers with length:diameter ratio of about 1,900 were used to produce an electrode plaque with 95% porosity, 0.025 inch thickness, and specific area 100 $cm^2/cm^3$. In U.S. Pat. No. 3,835,514 Pollock provided a similar electrode plaque with L:D of 800 to 8000:1, porosity of 70 to 97% and a diffusion bonded bus connector.

In U.S. Pat. No. 4,331,523 Kawasaki described electrodes suitable for water electrolysis comprising a perforate current collector, preferably titanium expanded mesh or titanium perforated plate coated with platinum group metals, with a "fibrous assembly" pressed against it to provide large surface area. He noted that the fibrous assembly could comprise a diffusion bonded "web" of titanium fibers coated with platinum groups metals. (Here and throughout, we use the term "platinum group metals" to mean the metallic elements Ru, Rh, Pd, Os, Ir and Pt and also their oxides.) Kawasaki did not specify L:D, porosity or specific area of the "fibrous assembly" in his electrodes, but his examples suggest values similar to those taught in U.S. Pat. Nos. 3,895,960 and 5,294,319.

In U.S. Pat. No. 4,708,888 Mitchell et al. described an electrode produced by applying an electrocatalytic coating to a fine titanium expanded mesh, then spot welding or metallurgically bonding current distributor members (also coated Ti) to the coated mesh.

In U.S. Pat. No. 5,294,319 Kaczur et al. combined and improved upon the elements of U.S. Pat. Nos. 3,895,960 and 4,331,523 to provide an electrode comprising a mat of randomly oriented cut titanium fibers of at least two distinct diameters with length:diameter greater than 1000:1 coated with platinum group metals and spot welded to a similarly coated titanium plate.

In U.S. Pat. No. 5,439,577 Weres and Hoffmann described but did not make an electrochemical cell wherein the anode comprised a porous body of particles or fibers of titanium sintered together and coated as described by them in U.S. Pat. No. 5,419,824. The cell comprised a series of such porous anodes in alternation with porous cathodes with porous separators between them, with the electrolyte forced to flow through this stack. In U.S. Pat. No. 5,439,577 they also described but did not make an electrochemical cell comprising (1) "an appropriate cylindrical form" with (2) a layer of coated Ti-fiber tow wound around it, followed by (3) "a nonconductive separator," followed by (4) a "permeable cathode," followed by (5) another noncounductive separator, and so in repetition of (2) to (5).

The electrode provided by Coin et al. in U.S. Pat. No. 5,783,050 comprises multiple layers of Ti-expanded mesh wound on a Ti-plate with an electrocatalytic coating applied to the assembly.

The electrode provided by Morin in U.S. Pat. No. 4,680,100 comprises a thick tow of thousands of very fine non-metallic fibers coated with a thin layer of metal and wound on a nonconductive plastic substrate member with electrical connectors attached to the ends of the tow using solder.

SUMMARY OF THE INVENTION

Herein we provide a large area electrode comprising a metallic fiber tow wound around a rectangular sheet metal plate. In the preferred embodiment, an electrode intended to function as an anode in an electrolytic water purification process and device is made by winding titanium fiber tow (preferably about 200 count with fiber diameter of about 18–25 µm) on to a flat rectangular plate made of titanium sheet, and a multilayered electrocatalytic coating is applied to provide the electrode properties desired. An electrode intended to serve as a cathode or in a battery can be made of a material appropriate to that application; for example, stainless steel, nickel, Hastelloy or another nickel alloy. Preferably, the metallic fiber tow is crimped to provide a wavy profile by running it between closely meshed gears as part of the winding process. The metallic fiber provides large active surface area, but the diameter of the fiber is large enough to allow an electrocatalytic coating to be applied without embrittlement or excessive cementation. Crimping the tow gives it a fluffy texture that is less prone to cementation by the electrode coating and provides good improved permeability to electrolyte flow in the finished electrode.

LIST OF DRAWING FIGURES

FIG. 1 shows the physical structure of the large surface area electrode, which in the preferred embodiment is an anode made of titanium with electrocatalytic coating applied.

FIG. 2 shows a cathode advantageously used together with the anode of FIG. 1, illustrating the use of nonconductive cords, meshes and spacers disposed between adjacent electrodes for improving electrical contact of the metallic fiber tow with the conductive substrate of the large surface area anode, while also improving electrical isolation between adjacent electrodes.

FIG. 3 illustrates the preferred method and device used to wind the Ti-fiber on to the Ti-metal plate to produce the large surface area electrode in FIG. 1.

DESCRIPTION OF THE DRAWINGS

The physical structure of the novel electrode is depicted in FIG. 1. The description that follows refers to the preferred embodiment of the invention, wherein a large surface area anode is made of titanium with an electrocatalytic coating applied.

Anode plate 20 is a rectangle of Ti-sheet. The edges of the plate are smoothed to prevent damage to the fiber, the corners are slightly rounded for safe handling, and one corner is rounded with a distinctly larger radius 22, allowing it to be used as an index for orienting the plates consistently during the coating process. Many turns of Ti-fiber tow 24, preferably crimped, are wound around anode plate 20. The ends of Ti-fiber tow 24 are tied to anode plate 20 using tie holes 26. Flow holes 28 provide water flow paths perpendicular to the plane of the anode when the anode is installed in the electrochemical cell illustrated in FIGS. 4 and 5 of related patent application Ser. No. 09/855,293. Assembly bolt holes 30 allow passage of the bolts that are used to assemble the cell.

Good electrical contact of the fiber to the substrate plate improves electrode function. Optionally, plastic edge trim 25 with approximate cross-section 25A may be applied to the edges of the anode after it has been coated to lock the fibers in place along the edges and improve electrical contact. Suitable edge trim made of extruded polyethylene is commercially available.

Figure 1:
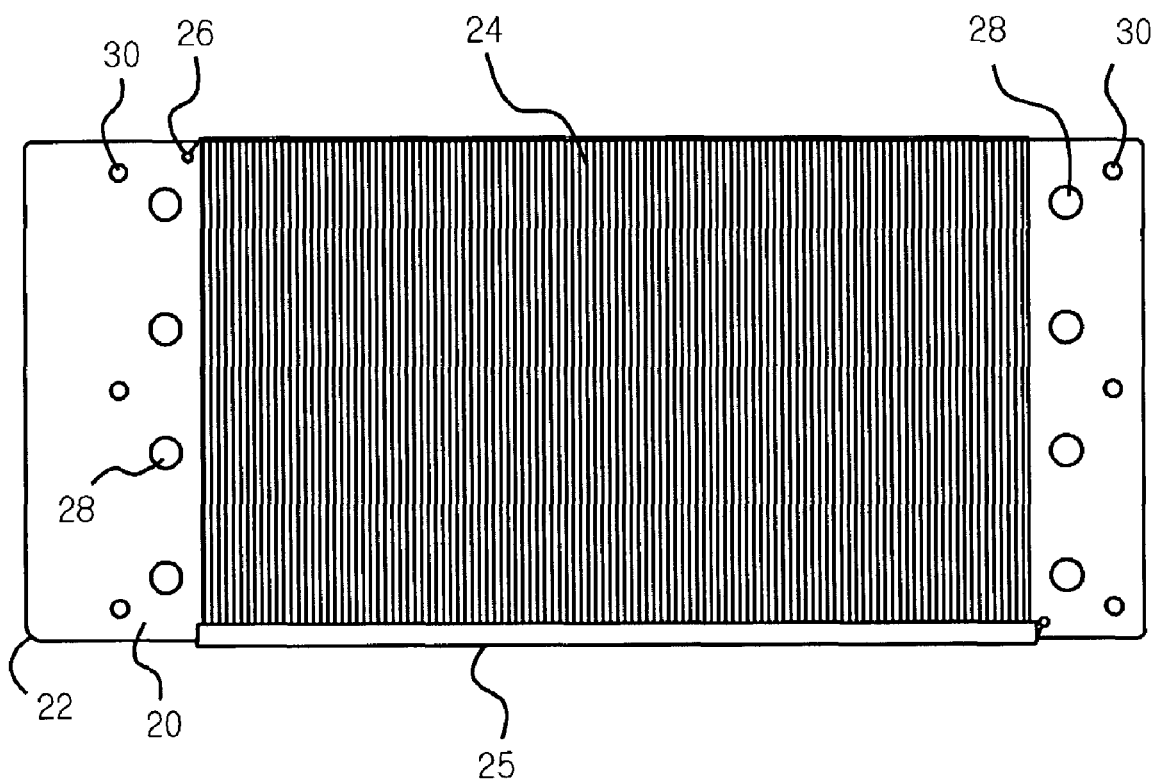
Figure 1:
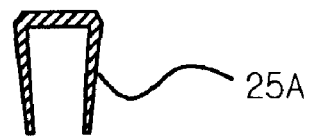
Figure 2:
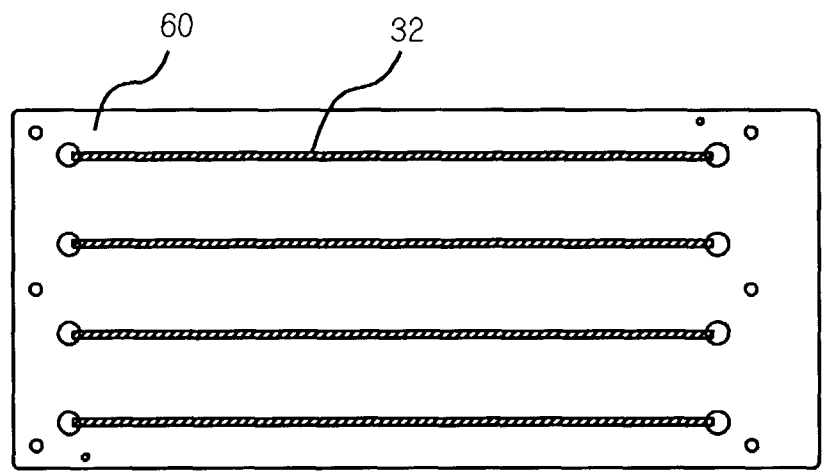
Figure 2:
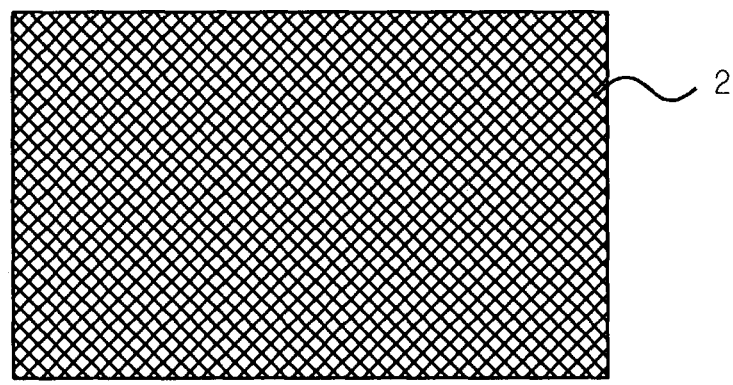
Figure 2:
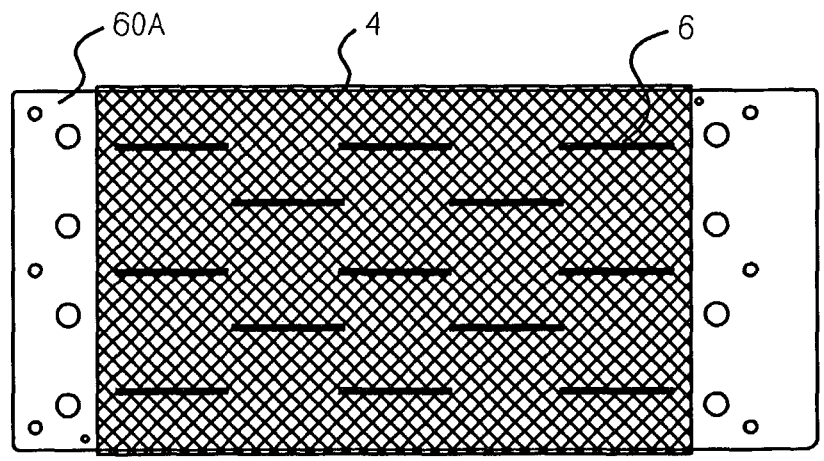

Another means for improving electrical contact is illustrated in FIG. 2, which depicts a cathode that can advantageously be used together with the anode of FIG. 1 in an electrochemical cell like that described in U.S. Pat. No. 6,589,405. Cathode 60 has the same dimensions as anode plate 20 shown in FIG. 1, the same flow holes 28, and the same assembly bolt holes 30. Stainless steel and corrosion resistant nickel alloys such as Hastelloy are suitable cathode materials and, in the example illustrated, the cathode is a metal rectangle with no metallic fiber applied. Loops of braided polypropylene rope (six stranded, hollow core, 0.125 inch=3.2 mm) are stretched along the length of cathode 60 between flow hole 28 at the opposite ends. Preferably, the loops are secured by thermally fusing the ends of the polypropylene rope together. In the assembled cell, these loops of rope press the Ti-fiber against the anode plate, locking the Ti-fiber in place and ensuring good electrical contact. Water flows through the cell in a direction parallel with the loops of rope, which therefore do not interfere with water flow.

When installed in an electrochemical cell, the anodes depicted in FIG. 1 will typically be pressed against cathodes similar to the one depicted in FIG. 2. In this case, it is necessary to provide some means to prevent direct electrical contact between the opposing anodes and cathodes and the short circuit that would thereby result. The preferred means for improving electrical isolation comprises one or more rectangles 2 of fine plastic mesh cut slightly larger than the fiber wound area on the anode, and placed between the adjacent anodes and cathodes.

The rope loops depicted in FIG. 2 also provide some degree of electrical isolation. It was found that a single rectangle of sheer polypropylene mesh pressed against the anode, or a single rectangle of vinyl-fiberglass mesh pressed against the cathode provides adequate electrical isolation in combination with the rope loops.

In order to provide improved electrical isolation between adjacent electrodes, a cylindrical sleeve of plastic mesh 4 can be placed or fastened around either electrode, and preferably around the cathode as illustrated at the bottom of FIG. 2. Spacers 6 made of plastic or another nonconductive rod or cord can conveniently be attached to mesh sleeve 4, to press the fiber against the anode plate in the assembled cell, whereby electrical contact is improved.

Figure 3:
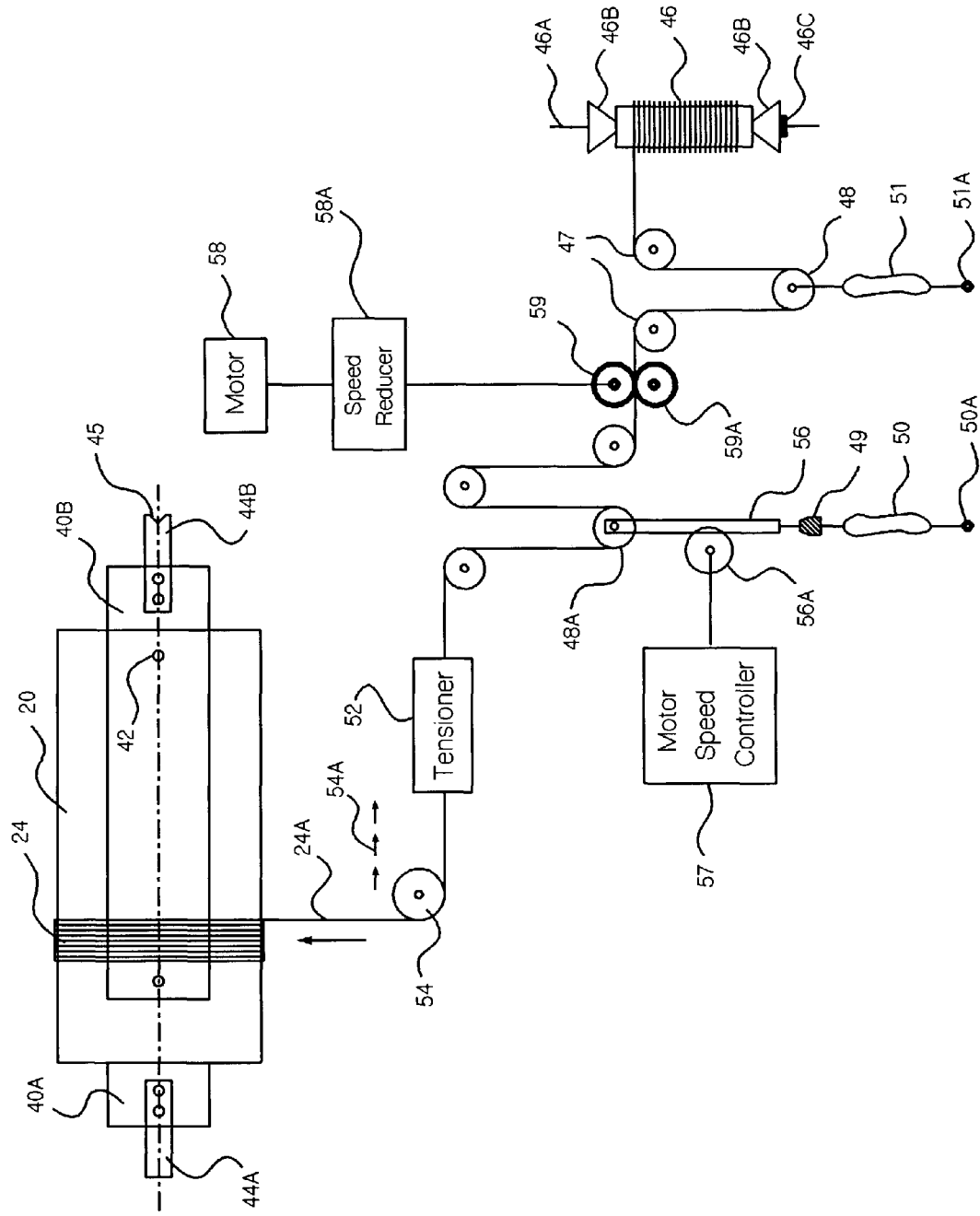

The method of winding the Ti-fiber tow on to the Ti-plate is illustrated in FIG. 3. A winding machine is conveniently made by modifying a metal-working lathe. The cross-feed platform is removed together with the tool holder assembly. A bracket is attached to the carriage and guide pulley 54 is mounted on it. The tensioner assembly 52 is attached to the lathe at the tail end. Tensioner assembly 52 preferably is the kind used in magnet winding machines. Anode plate 20 is bolted between two mounting plates 40A and 40B using machine screws 42 together with the appropriate washers and bolts. Machine screws 42 pass through assembly bolt holes 30 in the anode plates. Spindle pieces 44A and 44B are made of pieces of round aluminum rod machined half-round at one end only, allowing them to be bolted to mounting plates 40A and 40B. The other end of each spindle piece is round. Spindle piece 44A is clamped in the chuck of the lathe. Spindle piece 44B has a conical depression 45 machined into its cylindrical end. The point of the tail stock center is pushed against cylindrical depression 45 by adjusting the ram, thereby securely mounting the plate assembly on the lathe in a manner that allows it to be rotated. Mounting plates 40A and 40B and spindle pieces 44A and 44B are conveniently made of aluminum.

The lathe is geared to provide the pitch desired (typically 1.25 mm) and set to operate at a low speed. As the lathe rotates the plate assembly (that is, the entire bolted assembly comprising electrode plate 20, mounting plates 40A and 40B and spindle pieces 44A and 44B), the lathe carriage moves feed pulley 54 smoothly along the length of the electrode plate, and Ti-fiber tow 24A is evenly wound on to electrode plate 20 with the desired pitch. The rotation of electrode plate 20 pulls Ti-fiber tow 24A through most of the system. Tensioner 52 controls and evens out the tension of the tow. Rack gear 56 follows control dancer sheave 48A as the latter moves up-and-down in response to the speed of tow entering tensioner 52 relative to the speed of the tow passing between crimping gears 59 and 59A. The vertical motion of rack gear 56 causes gear 56A to rotate, actuating motor speed controller 57 which controls motor 58. The rotational speed of motor 58 is reduced and its torque increased by speed reducer 58A, which consists of a train of several timing belts and pulleys. The motor drives steel crimping gear 59 and identical freewheeling gear 59A which meshes with gear 59 and matches its rotation. In operation, the speed of the tow passing through tensioner 52 changes rapidly as electrode plate 20 rotates and takes up the tow, and the speed of the tow passing between gears 59 and 59A follows, whereby the tow exerts no tensile force against the gears; otherwise, the tow would fray and break. The tension on the tow in this part of the system is actually controlled by weight 49, and large excursions are damped and limited by rubber band 50 which is fastened to tie point 50A. Two reed switches are installed directly above dancers 48 and 48A which actuate a relay and cut power to the entire system if either dancer moves too far up for any reason.

Crimping gear 59 pulls the tow off of feed spool 46 which is mounted on vertical shaft 46A between plastic cones 46B, the lower of which is supported by ball-type thrust bearing 46C. The tow passes over directing sheathes 47 and dancer sheath 48. Rubber band 51 which is fastened to tie point 51A absorbs and damps out the large excursion that occurs when the system is started-up. The tow coming off of feed spool 46 is wetted by a spray of water containing a small amount of nonionic wetting agent to eliminate the possibility of fire caused by friction or static electricity and to decrease fraying and pilling of the tow.

The lathe is also provided with two reed switches located so that the edge of the carriage will press against one of them when feed pulley 54 has reached the end of the interval to be wound, cutting power to the system. After the lathe stops the ram is backed off and the chuck loosened to release the plate assembly. Machine screws 42 are removed, mounting plates 40A and 40B are pulled-out from between electrode plate 20 and Ti-fiber tow 24 wound on to it. Then another electrode plate is bolted into place and the entire plate assembly is mounted on the lathe. The lead screw direction control lever is adjusted to reverse the direction of carriage travel, and the lathe is turned on to wind the second electrode plate with the opposite pitch and direction of motion. Before turning on the lathe, the plate assembly should be rotated so that the tow is coming off guide pulley 54 is approximately parallel with the plane of electrode plate 20, to avoid breaking the tow.

DETAILED DESCRIPTION OF THE INVENTION

Improvements Over Prior Art

Metallurgically bonded fibrous electrode structures as provided in U.S. Pat. Nos. 3,895,960 and 4,331,523 and 5,439,577 are poorly suited to application of slurry-type electrocatalytic coating because a slurry coating composition would not penetrate into the structure of the electrode plaque and coat the fibers uniformly. The same is true of the electrode provided in U.S. Pat. No. 5,294,319 comprising fibers spot welded to a plate. The same problem would preclude reprocessing and recoating spent electrodes. Also, production costs would be high, and the electrodes would be highly susceptible to fouling by particulates in a waste water treatment application.

The unrealized electrochemical cell with fiber-wound, alternating, concentric anodes and cathodes described in U.S. Pat. No. 5,439,577 has several disadvantages: (1) the fiber needs to be coated first and then wound, a complex and tricky operation that would probably damage the fragile coating on the fibers and break the fibers themselves; (2) the anodes and cathodes are created as integral parts of the cell assembly, and cannot be made or handled separately; therefore, the cell cannot easily be disassembled; (3) recoating the anode fibers would require unwinding them and rewinding them after the recoating operation, a complex operation that would almost certainly break many fibers; (4) it would be difficult to provide electrical connections of adequate conductivity to the concentric anodes and cathodes; (5) the cylindrical assembly would have to be pressed between end-pieces (as in a cylindrical filter housing) to channel flow through the assembly, risking mechanical damage; (6) the cylindrical geometry of the cell assembly would be cumbersome to incorporate in a large capacity unit that includes many such cells.

The surface area of the expanded mesh in the electrode provided in U.S. Pat. No. 5,783,050 is not very large, and applying many layers of expanded mesh to provide a large surface area would make the electrode quite thick. Because electrolytic conductivity in a typical waste water treatment application is small, there would be large voltage drops in the electrolyte within the anode mesh, and the electrode would operate with uneven current distribution, with most of the current is bunched at the outermost layer of the electrode.

This electrode provided in U.S. Pat. No. 4,680,100 cannot be made of titanium or another valve metal, because titanium cannot be plated on to a nonmetallic fiber substrate, and titanium fiber tow is not available with the very small diameter and very large fiber count disclosed. If Ti-fiber tow of this geometry were available, coating it by dipping and baking would both embrittle and cement the very fine fibers; in particular, attempting to apply a slurry coating would cover the tow with a crust leaving most of the fibers inside the tow uncoated and practically inaccessible to electrolyte. If a Ti-fiber electrode with semiconductive oxide coating could be made with this geometry, it would be practically inoperable. With the modest electrolyte conductivity typical of most waste water treatment applications, current would not be able to penetrate into the thick tow much below its exposed surface, and most of the fibers in the tow would remain inactive. Also, the resistance of the very fine titanium fibers would be so large that the current would not travel more than a few inches along the length of the tow, causing most of the length of the tow to remain inactive. Conduction perpendicular to the fibers would be small, as the semiconductive coatings relevant to our application exhibit a contact resistance, effectively blocking current from penetrating more than a few fibers in the perpendicular direction. It would be difficult to solder electrical connectors to the ends of the tow, because solder doesn't wet the slurry coat. If a solder bond were achieved, the solder would be wetted by electrolyte and would corrode, contaminating the water being treated with tin and lead.

The electrode structure provided herein largely avoids these various drawbacks and limitations. It is easy to manufacture, Ti-fiber tow is commercially available as well as Ni-fiber tow and stainless steel tow, undesirable cementation of the fibers is not excessive even when a thick slurry-type coating is applied, the structure has good mass transfer and current distribution properties, the active surface area is large, and the electrode it lends itself to compact and easily fabricated cell designs; for example, the electrochemical cell illustrated in FIGS. 4 and 5 in U.S. Pat. No. 6,589,405.

In contrast to the cylindrically disposed layers coated Ti-fiber that comprise an integral part of the cylindrical cell described in U.S. Pat. No. 5,439,577, the large surface area electrode provided herein is a discrete electrode, that is manufactured and can be handled as a distinct object, distinct and separate from the balance of the cell assembly. The distinct nature of the electrodes provided herein greatly facilitates the manufacture of these electrodes themselves and assembly of the cell, and make it possible to easily disassemble and reassemble the cell as a part of routine maintenance. The distinct nature of the electrodes provided herein also renders possible the convenient recoating and reprocessing of these electrodes with a minimum of bother and greatly decreased damage to the metallic fiber.

Mass transfer is further improved and the tendency for cementation is further decreased by mechanically crimping the metallic fiber tow as the electrode is being wound, whereby a desirable fluffy texture is imparted to the metallic fiber tow. Fiber that was crimped during manufacturing at the iron-titanium composite stage is also commercially available, but gives an inferior product, because the commercially available tow is wavy but not at all fluffy: the fibers lie smoothly parallel to each other. The commercially available crimped tow can be crimped again when the electrode is wound, but that operation embrittles the fiber much more than initially straight tow is embrittled by crimping.

DETAILED DESCRIPTION OF THE INVENTION

Preferred Embodiment

In the preferred embodiment of the invention, the electrode is an anode made of titanium with an electrocatalytic coating applied. Preferably, an approximately 200 count tow of Ti-fibers with a nominal diameter of 18–25 micrometers is used. (The fibers do not have a circular cross-section, but the cross-sectional area of each fiber equals a circle of 18–25 µm diameter.) The fiber material is nominally pure Ti and preferably Ti-Gr.1, which has the best corrosion resistance. The substrate member is a rectangular plate made of Ti-sheet, 0.50 mm thick and preferably Ti-Gr.2, which is cheaper, harder and more readily available than Ti-Gr.1. (Ti-Gr.1 and Ti-Gr.2 are both nominally pure titanium, with a slightly larger level of impurity elements allowed in Ti-Gr.2.)

U.S. Pat. No. 6,589,405 describes a suitable coating sequence to produce an anode that can be used to purify water by generating hydroxyl free radicals. First, a "precoat" layer comprising iridium dioxide and tantalum pentoxide is applied to the metal, followed by a "sealing coat" of tin dioxide doped with antimony, and finally the "slurry coat," which consists of particles of titanium dioxide doped with niobium in the +4 oxidation state cemented together with a matrix of titanium dioxide that is doped with antimony.

The tow is conveniently produced using the composite drawing method provided in U.S. Pat. No. 3,394,213. Ti-fiber tow of this kind is commercially available in the United States and in Europe. The Ti-fiber tow is wound on electrode plate 20 with a pitch of 20 per inch or 1.27 mm; a different pitch may be needed to provide a smooth layer of fiber if Ti-fiber tow of a different fiber count or diameter is used.

The width and thickness of mounting plates 40A and 40B and the tension setting of tensioner 52 together determine the tension of the Ti-fiber tow after it has been wound on to electrode plate 20. In practice, one must take care that the Ti-fiber is not wound too tightly. If the Ti-fiber is too tight, it will bow the electrode plate 20 after the mounting plates 40A and 40B are withdrawn. Removing mounting plates 40A and 40B provides slack to the Ti-fiber, and the amount of slack increases with both the thickness and the width of the mounting plates. When winding electrodes 8 inches (203 mm) wide, mounting plates made of 3/32 inch (2.4 mm) aluminum sheet with a width of 6 inches (152 mm) give good results with the tensioner set at about 35 ounces force (10 newtons). Tensioning weight 50A is 4 oz. (113 g).

The degree of electrical isolation between adjacent electrodes in the assembled electrochemical cell (that is, anodes alternating with cathodes) must be good enough to prevent more than a small fraction of the total current through the cell being wasted by shortcircuiting between adjacent electrodes, preferably no more than a fraction of one percent.

For example, an electrochemical cell incorporating anodes electrically connected in parallel and each having a fiber-wound area measuring 203 mm×368 on each side should have electrical resistance between the anode and cathode power connectors equal to at least 30 ohms÷N, where N is the number of anodes in the cell, and the resistance is measured with the cell fully assembled but dry. Mesh 2 which provides improved electrical isolation between adjacent electrodes should be very sheer in order to minimize voltage drop in the electrolyte and minimize resistance to water flow; in fact, two layers of the finest meshes tested provided adequate electrical isolation as defined above. A mesh rectangle pressed directly against the anode is preferably made of polypropylene or another plastic which has good resistance to oxidation. A second rectangle of mesh adjacent to the cathode is conveniently cut from vent mesh made of vinyl coated fiberglass similar to window screen, but with openings about twice as large. A second polypropylene mesh rectangle can also be used. If two or more mesh rectangles cut from the same material are used, they should be cut with a different bias to prevent "locking" of the layers and possible interference with water flow.

Electrically isolating mesh sleeve 4 and attached spacers 6 which enhance electrical contact are, respectively, conveniently made of vinyl coated fiberglass vent mesh and tubular vinyl spline material; that is, the vinyl cord used to attach window screen to an aluminum window frame. The vinyl cord is easily welded to the vinyl coated mesh using a soldering gun equipped with a vinyl tile cutting tip, and the screen is likewise fastened to itself to fabricate the sleeve. With spacers 6 attached, a single layer of mesh provides adequate electrical isolation between the electrodes, and contact of the mesh with the coated fiber on the anode is largely prevented.

Conclusions and Ramifications

Although the description above contains many specificities, these should not be construed as limiting the scope of the invention but merely as providing examples of some of the presently preferred embodiments. Thus the scope of the invention should be determined by the appended claims and their legal equivalents, rather than by the examples given.

By "metallic fiber" is meant one or more long, essentially continuous fibers or strands of metal; for example, a tow comprising many metallic fibers, a fine wire or a multiplicity of fine wires. The fibers need not be round; in fact, the fibers in commercially available metallic fiber tow typically have an elongated, ridged cross-section. An expanded metal mesh as described in U.S. Pat. Nos. 4,708,888 and 5,783,050 would not serve as a component of the large surface area electrodes provided herein.

By "disposed in a wound manner," we mean that the metallic fiber comprising part of the completed electrode looks like it was wound on to the substrate member, whether-or-not it actually was wound on to the substrate member; for example, the fiber tow might actually have been wound on an appropriate temporary substrate member, coated, and subsequently transferred to the plate with winding geometry preserved. While a single winding layer of tow, tightly spaced, is described in the preferred embodiment, a more loosely spaced wind or multiple winding layers may also be used. Different fiber counts and fiber diameters can be used.

In the preferred embodiment, the electrode comprises Ti-metal fiber wound on to a flat, rectangular plate made of titanium sheet, and the resulting electrodes serve as anodes. Electrodes with substantially planar geometry are preferred, because they may be disposed in a substantially parallel relation, preferably by being assembled in a stack in alternating sequence with planar counterelectrodes. A rectangular frame made of titanium metal strips may also be used as the supporting member, or another design. Optionally, the Ti-fiber tow may be coated in a continuous process or while temporarily wound on a corrosion resistant temporary substrate member, then wound on to a coated Ti plate. An anode can be made of another valve metal with a suitable electrocatalytic coating applied.

A cathode or battery plaque of the same geometry can be made using a metal suited to the particular application; for example, by winding stainless steel fiber tow on to a stainless steel plate, or nickel fiber tow on to a nickel plate, or even carbon steel tow on a steel plate.

In the preferred embodiment, the large area electrode is the anode, and its counterelectrode in the complete electrochemical cell (that is, the cathode), is a flat piece of sheet metal with no fiber applied. A large area cathode (for example, made of stainless steel or nickel) can also be used with a simple planar anode (for example, titanium sheet with no fiber applied but coated with platinum or iridium dioxide) serving as the counterelectrode.

Ordinarily, the metallic plate and the metallic fiber tow will have essentially the same composition, and will be coated together. However, different materials may be used; for example, the substrate plate may be made of an alloy selected for rigidity and easy fabrication, while the fiber is selected for its electrochemical properties. Also, the plate and fiber may be coated separately, with different coatings applied, or else the plate may be coated, the fiber wound on to it, and then the entire electrode coated again. This last procedure may advantageously be employed to provide the plate with an extra thick iridium oxide containing precoat to prevent passivation while in service.

The substrate member of the electrode need not be made entirely of metal; for example, the substrate member can be a plastic plate with metallic strips attached to it which serve as current collects, whereby a composite substrate structure with adequate current collecting ability is produced with less weight and material cost.

While a rectangular substrate member is preferred, another shape could serve; for example, the width of the substrate member could vary along its length, an electrical connector tabs could extend from one end, etc.

In the preferred embodiment of the winding process which is depicted in FIG. 3, the metallic fiber tow is crimped just before it is applied to the metallic substrate plate. Alternatively, the metallic fiber tow could be crimped in a separate, earlier operation removed in time and space from the winding operation proper.

Many different electrocatalytic coatings can be applied to the high area electrodes herein provided, depending on the metal the electrode is made of and its intended use; for example, platinum and other platinum group metals, iridium oxide, manganese dioxide, lead dioxide, tin dioxide, a mixed oxide phase containing ruthenium, other mixed oxide coatings known to those skilled in the art, metallic tin, silver, nickel or copper, as well as various sequences of different coating compositions appropriate to the intended application. With some materials and applications, no coating at all might be needed; for example, a cathode made of stainless steel, nickel or Hastelloy. Various of the many coating application methods known to those skilled in the art may be used; for example, dipping in various aqueous and nonaqueous solutions or slurries followed by drying and baking, electroplating, or electroless plating.

The large surface area electrodes herein provided are advantageously used in an electrochemical cell with close spacing between the anodes and the cathodes, but they can also be used in an electrochemical cell or battery with wider spacing between the adjacent anodes and cathodes; for example, to allow the movement of water between vertically disposed electrodes by operation of convection instead of forced flow. In this case, mesh or another means for improving electrical isolation installed between the adjacent pairs of electrodes might not be necessary.

The quality of electrical contact needed between the fiber and the substrate plate will depend on the contact resistance. The contact resistance may be significant in a titanium anode with a electrocatalytic coating applied, making desirable the provision of some means to improve electrical contact in order to improve the operation of the anode. In other cases, for example a cathode made of nickel with no coating applied, the contact resistance may be much smaller, whereby special means for improving electrical contact may not be necessary.

Electrical isolation can be improved using separators of various kinds, so long as the material has suitably low electrical conductivity and usefully long service life. Suitable materials include polypropylene, polyethylene, EPDM rubber and other plastics or elastomers, as well as fiber glass mesh or cord or even short pieces of hard plastic or glass tubing or rod. Vinyl or vinyl-coated fiberglass cord could also be used, except that these materials should not be placed in large area contact with a titanium anode coated as described in U.S. Pat. No. 6,589,405.

The separators provided to improve electrical isolation means can be made of a wide variety of woven or nonwoven plastic or fiberglass mesh or cloth or another such electrically nonconductive and highly permeable material. In some cases nonconductive spacers (for example, polypropylene rope loops 32 in FIG. 2) may provide sufficient electrical isolation between adjacent electrodes.

While the devices provided to improve electrical contact are preferably made of electrically nonconductive material, whereby they simultaneously serve to improve electrical isolation, in some cases electrically conductive materials might also be used; for example, if mesh sleeve 4 is thick enough to reliably prevent direct contact of spacers 6 with the cathode plate 60 inside mesh sleeve 4, spacers 6 could be made by cutting pieces of titanium welding rod.

While polyethylene is the preferred material for edge strips 25 in FIG. 1, edge strips made of another plastic or elastomeric material may be used; for example, polypropylene, nylon, vinyl or EPDM rubber. Edge strips made of a suitable metal could also be used; for example, an extruded titanium edge strip could be used with an anode, or an extruded nickel edge strip could be used with a nickel cathode.

The invention claimed is:

1. A large surface area electrode comprising
   a substrate member having current collecting ability and
   metallic fiber tow comprising a multiplicity of fine metallic fibers having a surface,
   wherein said metallic fiber tow is disposed upon said substrate member in a wound manner,
   whereby said large surface area electrode has large active surface area and is easy to manufacture.

2. The large surface area electrode of claim 1, wherein said substrate member is essentially a flat piece of sheet metal.

3. The large surface area electrode of claim 2, wherein at least part of said surface of said metallic fiber tow is covered with an electrocatalytic coating having an outermost surface composition.

4. The large surface area electrode of claim 3, wherein said metallic fiber tow has a composition selected from the class consisting of titanium and titanium alloys.

5. The large surface area electrode of claim 4, wherein said outermost surface composition comprises titanium dioxide doped with one or more additive metals selected from the group consisting of niobium in the +4 valence state, tantalum in the +4 valence state, and antimony,
   whereby an electrode useful for water purification is produced.

6. The large surface area electrode of claim 4, wherein said electrocatalytic coating contains at least one platinum group metal.

7. The large surface area electrode of claim 2, wherein said metallic fiber tow comprises essentially a single layer of said metallic fiber tow covering at least a part of said substrate member.

8. The large surface area electrode of claim 1, wherein said metallic fiber tow is crimped,
   whereby an advantageously fluffy electrode structure is provided.

9. The large surface area electrode of claim 1, further provided with means for improving electrical contact of said metallic fiber tow with said substrate member.

10. The large surface area electrode of claim 9, wherein said large surface area electrode has edges, and said means for improving electrical contact comprise edge strips applied to said edges.

11. The large surface area electrode of claim 9, wherein said means for improving electrical contact comprise nonconductive spacers disposed adjacently to said large surface area electrode.

12. The large surface area electrode of claim 1, further provided with means for improving electrical isolation between said large surface area electrode and an adjacently disposed counterelectrode.

13. The large surface area electrode of claim 12, wherein said means for improving electrical isolation comprise at least one layer of a nonconductive mesh having a composition and disposed adjacently to said large surface area electrode.

14. The large surface area electrode of claim 13, wherein said composition of said nonconductive mesh is chosen from the class consisting of polypropylene, polyethylene and vinyl coated fiberglass.

15. A method to produce a large surface area electrode, comprising the step of winding multiple turns of a metallic fiber tow on to a metallic substrate member having a substantially planar geometry.

16. The method of claim 15, with the precursor step of mechanically crimping said metallic fiber tow prior to winding it on to said metallic substrate member.

17. The method of claim 15, with the subsequent step of applying an electrocatalytic coating to said large surface area electrode.

18. The method of claim 15, with the precursor step of applying an electrocatalytic coating to said metallic fiber tow.

* * * * *